(12) United States Patent
Neavitt et al.

(10) Patent No.: US 6,273,441 B1
(45) Date of Patent: Aug. 14, 2001

(54) VEHICLE SUSPENSION STABILIZING DEVICE

(76) Inventors: Thomas Neavitt; Charles Duquette, both of 3330 Sunrise Ave. #102, Las Vegas, NV (US) 89101

( * ) Notice: Subject to any disclaimer, the term of this patent is extended or adjusted under 35 U.S.C. 154(b) by 0 days.

(21) Appl. No.: 09/300,371

(22) Filed: Apr. 27, 1999

(51) Int. Cl.$^7$ ................................................ B60G 11/113
(52) U.S. Cl. .......................... 280/124.174; 280/124.175; 267/48
(58) Field of Search ................. 280/124.17, 124.174, 280/124.175; 267/40, 42, 48, 44, 45, 46, 234, 242

(56) References Cited

U.S. PATENT DOCUMENTS

| 915,227 | * | 3/1909 | Scott . |
| 1,125,199 | * | 1/1915 | Sprague . |
| 1,199,019 | * | 9/1916 | Obrecht . |
| 1,534,533 | * | 4/1925 | Lutman . |
| 1,550,046 | * | 8/1925 | Randolph . |
| 1,640,778 | * | 8/1927 | Laher . |
| 2,058,281 | * | 10/1936 | Wesley . |
| 2,973,196 | * | 2/1961 | Scheublein, Jr. et al. . |
| 3,168,300 | * | 2/1965 | Giovinazzo . |
| 3,173,668 | * | 3/1965 | Giovinazzo . |
| 3,312,459 | * | 4/1967 | Pence . |
| 4,175,772 | * | 11/1979 | Lampert ................................. 280/718 |
| 4,362,318 | * | 12/1982 | Lampert ................................. 280/718 |
| 4,997,202 | * | 3/1991 | Kitagawa et al. ............... 280/124.14 |
| 5,024,463 | * | 6/1991 | Oliver et al. .......................... 280/718 |
| 5,035,405 | * | 7/1991 | Reuter ................................... 266/250 |
| 5,137,300 | * | 8/1992 | Walton .................................. 280/718 |
| 5,992,831 | * | 11/1999 | Hellwig ................................... 267/45 |
| 6,062,549 | * | 5/2000 | Lamberti ................................ 267/48 |

FOREIGN PATENT DOCUMENTS 61-113508 * 5/1986 (JP) .

* cited by examiner

Primary Examiner—Paul N. Dickson
(74) Attorney, Agent, or Firm—Donn K. Harms

(57) ABSTRACT

An anti-roll suspension stabilizer for a vehicle having a leaf spring suspension system. The device features an elongated stabilizing spring communicating roll resistance to the attached axle of the vehicle at a center section and concurrent force at each of two ends of the stabilizing spring to the leaf spring of the vehicle through an attachment thereto using a shackle. Adjustment of the device is achieved by use of a plurality of mounting apertures for the shackles located at varying distances from the center of the stabilizing spring thereby allowing for adjustment by the user for desired performance characteristics. Further force adjustment is achieved using one or a combination of an optional axle spacer which can be made from one or both of solid rubber like material, or a pneumatic pillow which can vary in dimension, which would be located at the center section of the stabilizing spring where it communicates with the axle.

6 Claims, 2 Drawing Sheets

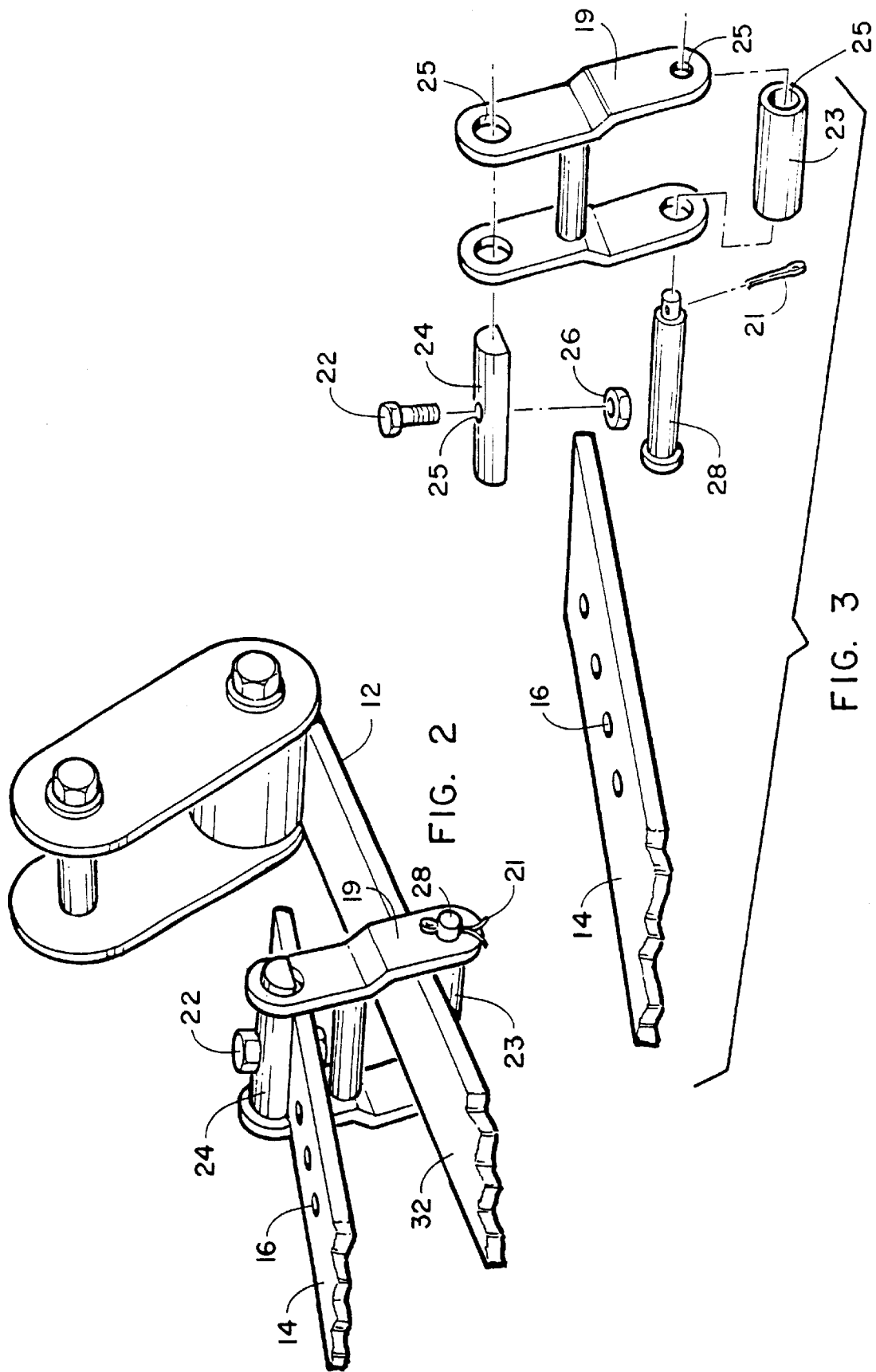

VEHICLE SUSPENSION STABILIZING DEVICE

BACKGROUND OF THE INVENTION

1. Field of the Invention

The present invention relates to the stabilization of vehicles. More particularly it relates to a device for attachment to the suspension system of motor vehicles which stabilizes the ride of such vehicles against roll-over, while moving upon a road while concurrently providing relief from the designed stiffness in some suspensions.

2. Prior Art

Modem motor vehicles have evolved to include a suspension system whereby the passenger section of the vehicle is elevated above the axles and wheels of the vehicle. Conventional suspension systems commonly use springs, rubber bushings, and motion stabilizers such as hydraulic shock absorbers, to dampen the effects of bumps and dips in the road surface being traveled, being transmitted to the passengers. The final effect of such suspension systems yielding a more tolerable if not more pleasant ride for the occupants of a vehicle traveling down less than perfectly surfaced roads, which are frequently encountered by vehicle traffic.

Such an arrangement of separating the passenger compartment from the axle and frame of the moving vehicle provides both benefits and drawbacks to the operation of the vehicle. In cases of modem and ever more popular four wheel drive, off road, and suburban utility vehicles (SUV's), the height of the passenger cabin is raised above the axle and frame of the vehicle to provide ground clearance for traversing dirt roads. This elevation of the passenger compartment by the suspension comes at the expense of overall vehicle stabilization which is decreased by raising the center of gravity of such vehicles. Such an increase in the height of the center of gravity yields an undesirable propensity of the vehicle to roll over during turns or other maneuvers. However raising the passenger compartment also yields the benefits of a generally more pleasant ride for occupants of the passengers' compartment from the dampening of shocks transmitted from the road surface, an elevated view of the road, and better ground clearance.

As is obvious, the more such vehicles are raised to achieve ground clearance and road view, the higher the chance of a roll over of the vehicle on a curve or large bump. The effects of a raised center of gravity are exacerbated with any addition of passengers and/or cargo. When such weight-maximized suspensions are loaded with less than their designed carrying ability, the suspension can be too stiff and thereby impart too much road shock to the occupants carried therein.

As such, a need is ever present for an easily installed auxiliary device that would help minimize the chance of roll over of top heavy vehicles, provide better cornering stability, while providing the additional benefit of softening the ride of vehicles with stiff suspensions. Such a device should allow for easy installation to the vehicle it is used upon and should be adjustable to allow for use on varying suspension configurations.

U.S. Pat. No. 2,058,281 (Wesley) addresses the dampening or anti-rebound effect of a top mounted spring, however Wesley is not easily installed, provides no ability for adjustment of the device on the vehicle and is incapable of use on vehicles which have the spring positioned above the axil upon which they ride.

U.S. Pat. No. 5,035,406 (Sellers) teaches an auxiliary leaf spring for attachment to factory leaf springs, to improve the cargo carrying capability of the vehicle. Sellers however, offers no ability to soften the ride afforded by stiff springs when unloaded and is not easily adjustable once installed.

U.S. Pat. No. 4,175,772 and 4,362,318 (Lampert) teach a spring mountable to the vehicle frame and leaf springs at opposing ends which soften lightly loaded stiff suspensions. Lampert however does not offer any roll-over resistance characteristics and requires substantial frame modification of the vehicle with the addition of an auxiliary spring mounting device.

U.S. Pat. No. 3,312,459 (Pence) and U.S. Pat. No. 3,173,668 (Giovinazzzo) both teach vehicle overload springs attachable to the leaf springs of a vehicle. Neither device affords any rollover recovery capability to vehicles and might actually increase rollover tendencies of the vehicle due to the force they provide which pushes the chassis away from the leaf springs supporting it.

U.S. Pat. No. 5,137,300 (Walton) and U.S. Pat. No. 5,024,463 (Oliver) feature variable rate helper springs attachable at one end to the vehicle axle and at the other to the vehicle frame. Both of these patents however fail to offer any roll-over resistance to the vehicle.

As such, there exists a need for an easily and inexpensively manufactured apparatus, which can be readily attached to most conventional leaf springs provided for suspension of vehicles. Such a device should also provide resistance to roll-over, improved dampening of a stiff ride at light loads, and should be adjustable to provide adaptability to various vehicle models and designs.

SUMMARY OF THE INVENTION

Applicants' device is an easily manufactured and installed spring stabilizing device designed to assist in preventing rollover of a vehicle. The shackle system of attachment at both ends of the elongated leaf spring yields an easily installed device upon conventional leaf spring suspensions.

The device consists of one or a plurality of elongated stabilizing leaf springs, having resilient characteristics when a portion thereof is deflected transversely. The device is attached to the axle and leaf spring of a vehicle in a placement to oppose and counteract the forces exerted against the primary suspension springs by virtue of a fulcrum effect of the axle against the center portion of the device and the existing primary leaf springs of the vehicle. The opposition and counter action of the forces developed results in a more responsive vehicle suspension which counteracts and/or restricts the lateral tilt of the vehicle when changing its direction of motion from a straight line, such as on a curve, thus imparting an anti-roll or anti-sway characteristic to the vehicle upon which it is installed.

Adjustability of the device is provided for differing load and design characteristics and to yield differing anti-roll characteristics is provided. This adjustable mount is provided by a plurality of adjustment apertures communicating through the elongated leaf spring at both ends of the elongated leaf spring and an optional axle spacer in the center section of the leaf spring.

A pair of shackles positioned at both ends of the elongated leaf spring yields an easily installed device upon conventional vehicle leaf springs.

The device consists of one or a plurality of elongated stabilizing leaf springs, having resilient characteristics when a portion thereof is deflected transversely. The device is attached to the axle and leaf springs of a vehicle in a placement to oppose and counteract the forces exerted against the primary suspension springs by virtue of a fulcrum effect of the axle against the center portion of the device and the existing primary leaf springs of the vehicle. The opposition and counter action of the forces developed results in a more responsive vehicle suspension and counteracts and/or restricts the lateral tilt of the vehicle when changing its motion from a straight line, such as on a curve, thus imparting an anti-roll or anti-sway characteristic to the vehicle upon which it is installed.

Adjustability of the device is provided for differing load and design characteristics and to yield differing anti-roll characteristics. The adjustable mount is provided by a plurality of adjustment apertures communicating through the elongated leaf spring at both ends of the elongated leaf spring and an optional vehicle axle spacer of one or both of solid rubber like material or a dimensionally variable pneumatic pillow. A pair of shackles provide communication of the force generated at both ends o f the flexed elongated leaf spring with the conventional vehicle leaf spring. This communication is provided by attached shackles which slidably communicate with the bottom surface of the flexed vehicle spring and it adjusted by positioning the shackle in a mounting with the desired aperture positioned at both ends of the elongated leaf spring using conventional fasteners such as a nut and bolt therethrough. The resulting communication of force from both ends of the device with the surface of the leaf spring, with slidably mounted upper and lower shackle pins, located on the shackle, imparts the desired force to dampen a stiff suspension, while concurrently imparting anti-sway or roll-over force to the vehicle during turns and other maneuvers which tend to sway or impart roll to a vehicle.

An object of this invention to provide for anti-sway to vehicles to which it is attached while also improving the roll recovery characteristics already in place and thereby avoid or alleviate roll over of the vehicle.

Another object of this invention is to provide a softening of the action of a lightly loaded or a stiff suspension on a vehicle.

A further object of this invention is the provision of adjustable mounting of the device to achieve differing anti-sway and stiffness dampening characteristics for the vehicle on which it is mounted and to allow the device to be adaptable to various vehicle models.

Further objects of the invention will be brought out in the following part of the specification, wherein detailed description is for the purpose of fully disclosing the invention without placing limitations thereon.

BRIEF DESCRIPTION OF DRAWING FIGURES

FIG. 2 is a perspective side view of the applicant's device and the attachment at each and to the vehicle leaf spring.

FIG. 3 is an exploded view of the shackle portion of the invention.

DETAILED DESCRIPTION OF THE PREFERRED EMBODIMENTS OF THE INVENTION

Figure 1:
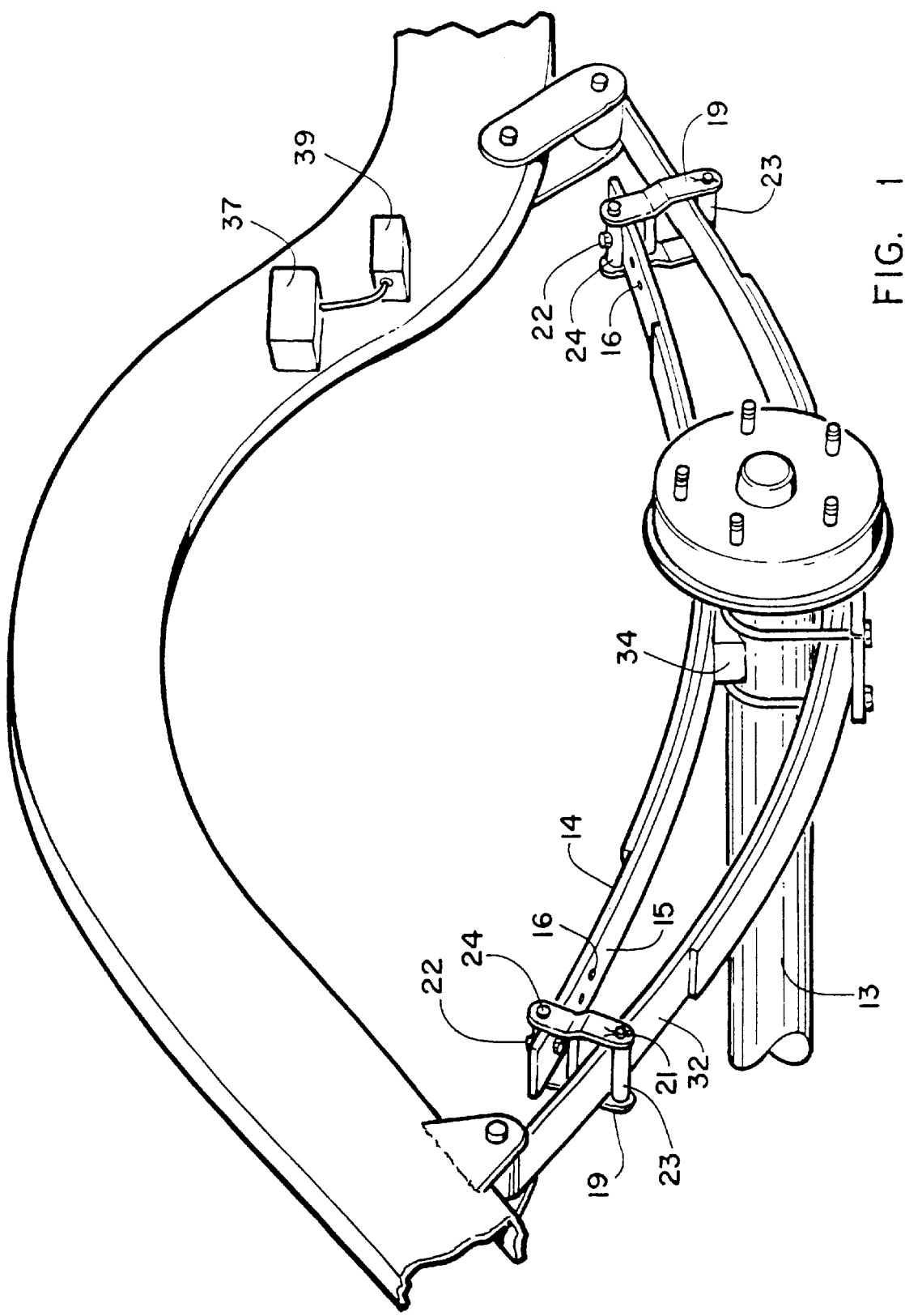
FIG. 1 is a perspective view showing the vehicle suspension stabilizing device attached to the vehicle leaf spring in a dampening position.

Referring now to the drawing Figures, specifically FIGS. 1 through 3 depict preferred embodiments of the invention herein disclosed and the operation thereof.

FIGS. 1–3 depicts the vehicle suspension stabilizing device 10 attached to a conventional vehicle leaf spring 12 in a dampening position. The device 10 features an elongated stabilizer spring 14 having one or a plurality of apertures 16 communicating therethrough at both ends. Provision of a plurality of such apertures 16 in differing positions at both of the two ends of the stabilizer spring 14 provides for adjustment of the attachment of the device 10 to the vehicle at the leaf spring 12 as well as for adjustment of the force communicated by the device 10 to the leaf spring 12 and axle 13 to yield the user desired and defined anti-sway and stiff suspension dampening characteristics.

The stabilizer spring 14 is best manufactured from a resilient material such as steel or composite flexible material such as fiberglass and graphite fibers to yield the desired resiliency to produce the biasing force intended when mounted. The stabilizer spring 14 may also be prestressed or bent to an arc to achieve the desired resiliency when deflected in the opposite direction of the arc or prestressed dimension. At both ends of the stabilizer spring 14 there is an attachment to a shackle 18 using conventional fasteners such as a bolt 20 and attachable nut 22 through an in passageway in the shackle mounting pin 24 which is rotatably mounted in appropriately sized apertures 25 at both ends to the sidewalls 19 of the shackle 18. This rotatable mount allows for lateral translation of the ends of the stabilizer spring 14 in relation to the vehicle leaf spring 12.

The sidewalls 19 communicate with both ends of shackle mounting pin 24, an upper shackle pin 26, and a lower shackle pin 28. When attached to both ends of the stabilizer spring 14, and in operating position to opposite sides of the vehicle leaf spring 12, the shackles 18, maintain both ends of the stabilizer spring 14 in a deflected position over the center section of the stabilizer spring 14 where the lower side 15 of the stabilizer spring 14 communicates force with the vehicle axle 13. The shackles 18 so attached opposite sides of the leaf spring 12 and transversely deflecting the stabilizer spring 14 at a communication point on its lower side 15 with the axle 13, thereby communicate a bias or force from ends of the stabilizer spring 14 to the vehicle leaf spring 12. The shackle mounting pin 24 is freely rotatable within apertures in the sidewalls 19 of the shackle 18 much like a hinge. The lower shackle pin 28 is easily removable from the side walls 19 and remount able through appropriately sized apertures to operatively contain it therein. To mount or dismount the device 10 to the vehicle, the lower shackle can be removably positioned in place in the sidewalls 19 using a pin 21 through an appropriately sized pin aperture in the distal end of the shackle pin 28 to thereby maintain the lower shackle pin 28 in the removable mount to the sidewalls 19. So mounted, the shackle pin 28 holds the roller 23 in biased contact with the lower surface 32 of the leaf spring 12. The lower shackle pin 28 can thus be easily installed or removed from the shackle 18 as needed for mounting of the stabilizer spring 14 over the axle 13 and thereafter deflecting both ends of the stabilizer spring 14 to yield a calculated biased communication through the connected shackle 18 and roller 23 with the vehicle leaf spring 12. This biased communication is maintained during use by replacing the lower shackle pin 28 in operative position in the sidewalls 19 and holding the roller 23.

As depicted the roller 23 has an axial passageway 25 therethrough and mounts about the outside circumference of the lower shackle pin 28 in between the sidewalls 19 and thereby insures that the biasing force transmitted from the stabilizer spring 14 through the shackle 18 to the vehicle leaf spring 12 is done so smoothly and without the binding that might occur without the roller 23. However if a less functional version of the device 10 were desirable then the roller 23 could be omitted but as is obvious the current best mode of the device 10 functions best with the roller 23 in place. The roller 23 and shackle pin 28 are best made from metal such as steel to insure they hold up well to the constant abrasion caused by biasing against or upon the leaf spring 12. The sidewalls 19, the shackle mounting pin 24, the upper shackle pin 26 and lower shackle pin 28 also are best constructed of steel or in some cases aluminum to hold up to the stresses and general wear and tear involved in the operation of the device in the automotive world.

The upper shackle pin 26 can be welded or bolted to the sidewalls 19 or can actually be cast as part of the two sidewalls 19 should the shackle 18 and sidewalls 19 be cast as a part. Its primary purpose is to provide strength and stability to the shackle for the forces acting thereon.

Of course those skilled in the art may have other manner of communicating the biasing force generated at both ends of the stabilizer spring 14 to the vehicle leaf spring 12 with the deflecting force being communicated to the axle 13, and such other means of communication of force from the ends of the stabilizer spring 14 to the leaf spring 12 and from the center of the stabilizer spring 14 to the axle 13, are anticipated. However the current best mode features the upper shackle pin 26 and lower shackle pin 28 with roller 23 attached, communicating a predetermined biasing force derived from deflecting the two ends of the stabilizer spring 14, over the axle 13 at the center area of the spring 14. The roller communicates the biasing force from the stabilizer spring 14 to the lower surface 32 of the leaf spring 12. Concurrently, a deflecting or opposite force is communicated at the center section of the stabilizer spring 14 to the top of the communicating axle 13.

As noted, the biasing force generated at both ends of the stabilizer spring 14 and communicated to the leaf spring 12 is provided by a fulcrum effect of the upwardly resilient stabilizer spring 14 being deflected from its two ends over the axle 13 or an optional axle spacer 34. Currently a force between 60 foot pounds and 90 foot pounds at each end of the stabilizer spring 14 works best. The opposite force acting at the center section of the stabilizer spring 14 upon the axle would of course, be double the force at one end or between 120 and 180 foot pounds. The resulting upward biasing force communicated though the attached shackles 18 to the vehicle leaf spring 12 helps dampen the stiff ride while the downward force communicated to the axle 13 over which the stabilizer spring is deflected communicates an anti-sway force to the attached body of the vehicle during turns and other changes of direction of the moving vehicle.

The device would work best in pairs wherein both of the pairs so mounted would help dampen the stiffness of leaf springs 12 if desired, during a straight course of travel of the vehicle. On a turn of the vehicle, natural forces acting upon the vehicle force the axle 13 at the center portion of the leaf spring 12 toward the ground on one side of the vehicle, while concurrently raising the axle 13 and center portion of the leaf spring 12 on the opposite side of the vehicle. In such instances the pair of devices 10, so attached to opposite wheels, work in a symbiotic relationship with each other, to help oppose the downward force on one leaf spring 12 upon the attached axle 13 while concurrently counteracting the rising force upon the other leaf spring 12 from the axle 13. In such instances the natural tendency of the vehicle to sway or actually reach a position wherein it can roll over is thus inhibited by the device through its provision of countering force opposing the lowering or raising of the respective axle 13 at its attachment to the center portion of the leaf spring 12

Adjustment of this countering force is achieved by positioning the shackle 18 further toward the center section of the stabilizer spring 14 for less force, or, further distant from the center section of the stabilizer spring 14 for more opposing force, using a plurality of apertures 16, located at both ends of the elongated stabilizer spring and varying distances from its center. Further adjustment of forces can be achieved by insertion of one or more of the optional axle spacers 34 between the axle 13 and the stabilizer spring 14 or varying the thickness of the axle spacer 34, or by various combinations of axle spacer 34 and position adjustments of the shackles 18 from the center of the stabilizer spring 14. The optional axle spacer 34 can be of a solid rubber or durable synthetic material such as that of tire rubber, or of a pneumatic style that is of durable material and inflatable. They could also be used in combination with a rubber and pneumatic axle spacer 34 achieving the desired spacing. The pneumatic pillow style axle spacer 34 would become stiffer and larger when pressure therein is increased using compressed air to inflate it thus providing more force to the device, or conversely it can be deflated and thereby provide less force. A conventional air pump attached to the pneumatic pillow style axle spacer 34 can be inflated using a conventional inflation switch 37 or automatic leveling switch 39 to activate the pump as required to reach the level required. Use of the optional pneumatic pillow style axle spacer 34 and optional onboard pump 37 or the conventional pump inflation at a service station through the attached air lines 41 would also allow for uneven adjustment of each side of the vehicle to adjust for uneven loads in the vehicle. Venting the air from the pneumatic pillow style axle spacer 34 would allow for reduction of dimension and adjustment of force of the device.

By mounting the shackle 18 to the ends of the stabilizer spring 14 using the bolt 20 and nut 22 or other fasteners in the appropriate one of the plurality of apertures 16 with varying distance from the center section of the stabilizer spring 14, and by the use of, or omission of the optional axle spacer 34 which could be conventional solid synthetic material or and an adjustable pneumatic pillow, the force exerted on the axle 13 by the center of the stabilizer spring 14 and conversely on the leaf spring 12 by both ends of the stabilizer spring 12 can be adjusted to an infinite number of levels to thereby meet virtually any operational requirements or desires of the user to achieve optimum ride and anti-sway characteristics.

While all of the fundamental characteristics and features of the vehicle suspension stabilizing device herein disclosed have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A vehicle suspension stabilizing device for use in combination with a vehicle suspension having a leaf spring attached to an axle, comprising:

an elongated stabilizer having an upper surface, a lower surface, two ends, and a center section;

said elongated stabilizer attachable at said center section, to a fixed position above said axle and above a top surface of said leaf spring;

means to maintain said elongated stabilizer deflected transversely toward said lower surface when paid center section is attached above said axle;

said two ends providing a calculated biasing force from each of said two ends toward said upper surface, when said elongated stabilizer is deflected transversely at said center section toward said lower surface;

means to communicate said calculated biasing force from each of said two ends of said elongated stabilizer to the bottom surface of said leaf spring, at each of two corresponding ends of said leaf spring; and a spacer, said spacer positionable between said elongated stabilizer and said axle when said elongated stabilizer is in said fixed position, said spacer providing a means for adjustment of the amount of said calculated biasing force provided by said two ends of said elongated stabilizer by varying the dimension of said spacer.

2. The vehicle suspension stabilizing device as defined in claim 1 wherein said means to maintain said elongated stabilizer deflected transversely toward said lower surface comprises shackles attached at each of said two ends of said elongated stabilizer at a first end of said shackles, said skackles communicating at a second end with said bottom surface of said leaf spring, said shackles having a pair of sidewalls communicating between said first end of said shackles and said second end of said shackles.

3. The vehicle suspension stabilizing device as defined in claim 2 wherein said shackles are rotatably attached to said ends of said elongated stabilizer at said first end of said shackle, said shackles having a roller communicating with said bottom surface of said leaf spring mounted at said second end of said shackle between said sidewalls.

4. The vehicle suspension stabilizing device as defined in claim 3 wherein said sidewalls have a first pair of apertures therein at said first end for receiving a rotatable shackle pin therein, a second pair of apertures located in said sidewalls at said second end of said shackle for receiving a removable pin therein; and said roller having an axial bore therethrough, said roller mountable on said removable pin.

5. The vehicle suspension stabilizing device as defined in claim 1 wherein said means for adjustment of the amount of said calculated biasing force provided by said two ends of said elongated stabilizer additionally comprises a plurality of apertures at each of said two ends of said elongated stabilizer, said plurality of apertures of a varying distance from said center section of said elongated stablilizer; and said ends of said elongated stabilizer mountable to said first end of said shackles using any one or said plurality apertures.

6. The vehicle suspension stabilizing device as defined in claim 1 wherein said spacer is a pneumatic pillow capable of inflation using a communicating compressed air supply and deflating by venting said compressed air supply.

* * * * *